US012729300B2

(12) United States Patent
Suzuki et al.

(10) Patent No.: US 12,729,300 B2
(45) Date of Patent: Sep. 8, 2026

(54) COATED ELECTRIC CABLE SEALING COMPOSITION, AND METHOD FOR SEALING COATED ELECTRIC CABLE

(71) Applicant: TOAGOSEI CO., LTD., Tokyo (JP)

(72) Inventors: Yuko Suzuki, Aichi (JP); Masashi Yamada, Aichi (JP); Hiroyuki Yamaga, Aichi (JP)

(73) Assignee: TOAGOSEI CO., LTD., Tokyo (JP)

( * ) Notice: Subject to any disclaimer, the term of this patent is extended or adjusted under 35 U.S.C. 154(b) by 853 days.

(21) Appl. No.: 18/010,803

(22) PCT Filed: Jun. 29, 2021

(86) PCT No.: PCT/JP2021/024474

§ 371 (c)(1),
(2) Date: Dec. 15, 2022

(87) PCT Pub. No.: WO2022/004695

PCT Pub. Date: Jan. 6, 2022

(65) Prior Publication Data

US 2023/0235164 A1 Jul. 27, 2023

(30) Foreign Application Priority Data

Jun. 30, 2020 (JP) ................................ 2020-112746

(51) Int. Cl.

*C08L 63/00* (2006.01)
*C08G 59/40* (2006.01)
*H01B 3/40* (2006.01)
*H01B 7/282* (2006.01)

(Continued)

(52) U.S. Cl.

CPC .............. *C08L 63/00* (2013.01); *C08G 59/40* (2013.01); *H01B 3/40* (2013.01); *H01B 7/282* (2013.01);

(Continued)

(58) Field of Classification Search

CPC .......... H01B 3/40; H01B 7/285; H02G 15/04; H02G 15/08; C08L 63/00–10;

(Continued)

(56) References Cited

U.S. PATENT DOCUMENTS 3,853,812 A * 12/1974 Helm .................... C08G 59/56 544/402
2009/0186975 A1 * 7/2009 Schaal .................... H01B 3/40 524/437

FOREIGN PATENT DOCUMENTS

CN 105788767 7/2016
EP 0428882 5/1991

(Continued)

OTHER PUBLICATIONS

"International Search Report (Form PCT/ISA/210) of PCT/JP2021/024474", mailed on Sep. 7, 2021, with English translation thereof, pp. 1-4.

(Continued)

*Primary Examiner* — Kregg T Brooks
(74) *Attorney, Agent, or Firm* — JCIPRNET

(57) ABSTRACT

A sealing composition and a sealing method for a coated electric cable have excellent sealing performance even under conditions such as cooling-heating cycles or high temperature and humidity. The coated electric cable sealing composition is for sealing a core wires connection section formed by electrically connecting multiple core wires exposed from multiple coated electric wires, and features having a hardening time of 10 minutes or less at 130° C., and permeating to inside of the coated electric wires at a height of 5 mm or more at the time point of hardening while the exposed parts of the core wires including the core wires connection section and the boundary part between the coated parts and the exposed parts of the core wires are immersed (Continued)

perpendicularly in the coated electric cable sealing composition filled in a resin cap and the sealing composition is heated to be cured.

8 Claims, 2 Drawing Sheets

(51) Int. Cl.
*H01B 13/32* (2006.01)
*H02G 15/04* (2006.01)

(52) U.S. Cl.
CPC ........ *H02G 15/04* (2013.01); *C08L 2203/206* (2013.01); *H01B 13/328* (2013.01)

(58) Field of Classification Search
CPC ....... C08G 59/50–60; C09D 163/00–10; C09J 163/00–10
See application file for complete search history.

(56) References Cited

FOREIGN PATENT DOCUMENTS

| | | | |
|---|---|---|---|
| JP | 2005005150 | 1/2005 | |
| JP | 2007317470 | 12/2007 | |
| JP | 2010154733 | 7/2010 | |
| JP | 2019179597 | 10/2019 | |
| TW | 200903928 | 1/2009 | |
| WO | WO-2018167551 A1 * | 9/2018 | ........... C09D 163/00 |

OTHER PUBLICATIONS

“The First Office Action of China Counterpart Application”, with English translation thereof, issued on Dec. 29, 2025, pp. 1-14.

* cited by examiner

COATED ELECTRIC CABLE SEALING COMPOSITION, AND METHOD FOR SEALING COATED ELECTRIC CABLE

CROSS-REFERENCE TO RELATED APPLICATION

This application is a 371 application of the International PCT application serial no. PCT/JP2021/024474, filed on Jun. 29, 2021, which claims the priority benefits of Japanese Patent Application no. 2020-112746, filed on Jun. 30, 2020. The entirety of each of the above-mentioned patent applications is hereby incorporated by reference herein and made a part of this specification.

FIELD OF THE INVENTION

This invention relates to a sealing composition and a sealing method for a coated electric cable both having excellent sealing performance even under conditions such as cooling-heating cycles or high temperature and humidity, which are widely applicable as a sealing agent and a sealing method for a coated electric cable in electric wiring of various electrical systems such as automobiles, household appliances and office automation (OA) machines.

BACKGROUND ART

In order to branch electric cables such as a wire harness used as an electrical part of an automobiles, sometimes plural electric wires are electrically connected at the ends thereof. The connection is made by, for example, stripping off the coating at end portions of the plural coated electric wires to expose the core wires and connecting the exposed plural core wires with bonder processing or the like. Such connection section of core wires needs to be insulated from the outside to improve circuit reliability, and needs to be sealed for waterproofing. So far, sealing methods using various methods have been studied.

Conventionally, sealing the core wires connection section with a thermosetting resin is well known. However, in order to make the sealing complete, the thermosetting resin has to sufficiently permeate into narrow gaps such as the gap between the core wires in the core wires connection section, the gap between the coated electric wires, and the gap between each core wire and its coating. For this purpose, the viscosity of the thermosetting resin needs to be low. In general, when making a product using a thermosetting resin, the thermosetting resin can be cured at a relatively high temperature in the viewpoint of raising productivity. However, in this application, because the thermosetting resin thickens with the proceeding of the curing reaction before sufficiently permeating the above gaps, it cannot be cured at a high temperature.

Regarding this, Patent Literature 1 describes a method of sealing a core wires connection section, which is a sealing method using a resin to seal a core wires connection section formed by electrically connecting a plurality of core wires exposed from a plurality of coated electric wires, and is characterized in immersing the core wires connection section in a thermosetting resin and curing the thermosetting resin within a temperature range that allows the thermosetting resin to maintain a resin viscosity of 1 Pa·sec or less for at least one minute.

By immersing the core wires connection section in a thermosetting resin heated within a temperature range in which the progress of curing is relatively slow and curing the thermosetting resin within the temperature range, the sealing method has the advantage that a relatively long period of time before the sharp rise of viscosity due to the curing can be ensured so that the thermosetting resin can sufficiently permeate into narrow gaps such as the gap between the core wires in the core wires connection section, the gap between the coated electric wires and the gap between each core wire and its coating.

However, because the method described in Patent Literature 1 immerses the core wires connection section in a thermosetting resin heated in a temperature range in which the progress of curing is relatively slow and cures the thermosetting resin in the temperature range to ensure a relatively long period of time before the sharp viscosity rise due to curing, there is a long period of time before the eventual hardening. Specifically, according to its Examples, it took 10 min or more to harden the curable resin, so there was a problem of poor production efficiency.

Hence, in cases of sealing the core wires connection section with a thermosetting resin, means that adopts high-temperature curing to improve production efficiency and also completes the sealing in this situation is still unknown.

CITATION LIST

Patent Literature

Patent Literature 1: Japanese Patent Laid-Open no. 2007-317470 (JP2007317470A)

SUMMARY OF THE INVENTION

Technical Problem

The issue to be addressed by this invention is to provide a sealing composition and a sealing method for a coated electric cable both having excellent sealing performance even under conditions such as cooling-heating cycles or high temperature and humidity. The sealing composition can harden in a short time of 10 minutes or less in the sealing operation of the coated electric cable, so the production efficiency of the operation can be improved.

Solution to Problem

Means for addressing the above issues include the following aspects.

<1> is a coated electric cable sealing composition for sealing a core wires connection section formed by electrically connecting a plurality of core wires exposed from a plurality of coated electric wires, which is characterized in that the hardening time thereof at 130° C. is 10 minutes or less, and while the exposed parts of the core wires including the core wires connection section and the boundary part between the coated parts and the exposed parts of the core wires are perpendicularly immersed in the coated electric cable sealing composition filled in a resin cap and the coated electric cable sealing composition is heated to be cured, at the time point of hardening, the coated electric cable sealing composition permeates into inside of the coated electric wires at a height of 5 mm or more.

<2> is the coated electric cable sealing composition of <1> which is characterized in that the hardening time thereof at 130° C. is 4 minutes or less.

<3> is the coated electric cable sealing composition of <1> or <2> which comprises an epoxy component and a curing component.

<4> is the coated electric cable sealing composition of <3> in which the epoxy component comprises, as a main component, an epoxy resin having 4 or less epoxy groups per molecule.

<5> is the coated electric cable sealing composition of <3> or <4> in which the epoxy component comprises, as a main component, a bisphenol A epoxy resin and/or a bisphenol F epoxy resin.

<6> is the coated electric cable sealing composition of <3> which is characterized in that the curing component is an amine compound or a mercapto compound.

<7> is the coated electric cable sealing composition of any one of <3> to <6> which further comprises a reactive diluent.

<8> is the coated electric cable sealing composition of any one of <3> to <7> which further comprises a coupling agent.

<9> is a method for sealing a coated electric cable, the method comprising: filling the coated electric cable sealing composition of any one of <1> to <8> in a resin cap; immersing, in the coated electric cable sealing composition, the exposed parts of the core wires including the core wires connection section and the boundary part between the coated parts and the exposed parts; and heating the resin cap to harden the coated electric cable sealing composition.

<10> is an electric cable coated with a cured product of the coated electric cable sealing composition of any one of <1> to <8>.

Advantageous Effects of Invention

With the sealing composition and the sealing method for a coated electric cable of this invention, the sealing performance for the coated electric cable can be maintained even under conditions such as cooling-heating cycles or high temperature and humidity, and hardening can be achieved within 10 minutes so that the productivity is also excellent.

DESCRIPTION OF EMBODIMENTS

This invention is specifically described as follows.

The sealing method of this invention is a method for sealing, with a sealing composition, a core wires connection section formed by electrically connecting a plurality of core wires exposed from a plurality of coated electric wires, which is characterized in that the core wires connection section is immersed in the sealing composition and hardening can be achieved with heating of 10 minutes or less at 130° C.

Figure 1:
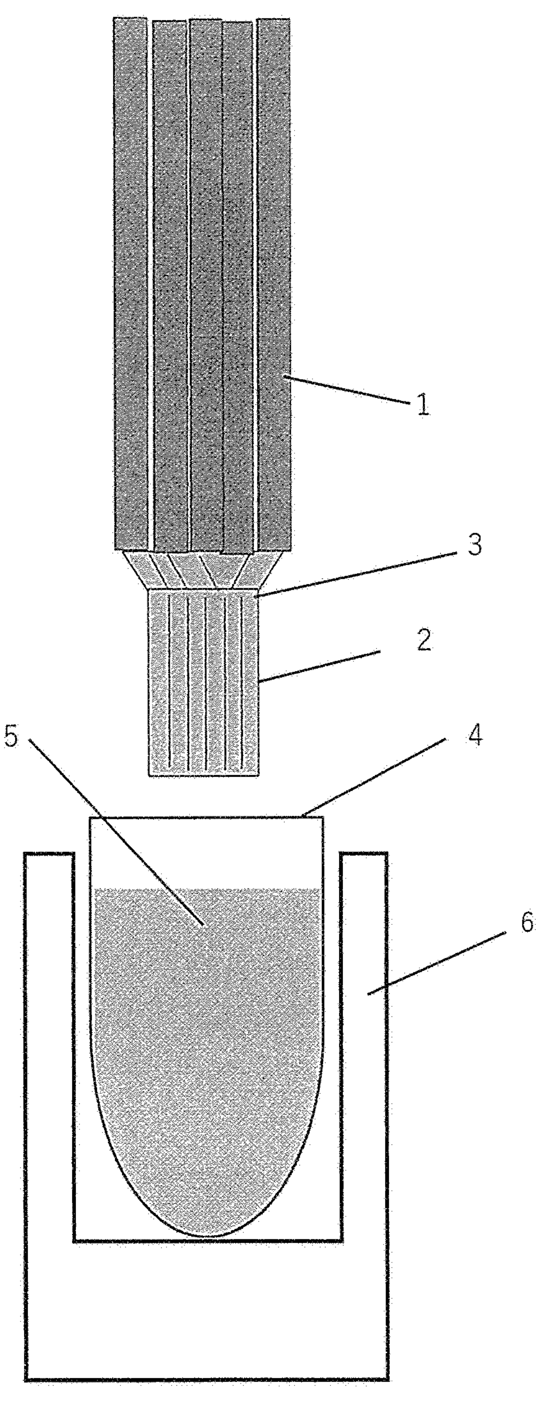
FIG. 1 schematically illustrates the state before the exposed parts of the core wires including the core wires connection section and the boundary part between the coated parts and the exposed parts of the core wires are immersed in the coated electric cable sealing composition of this invention filled in a resin cap in the coated electric cable sealing method of the invention.
Figure 2:
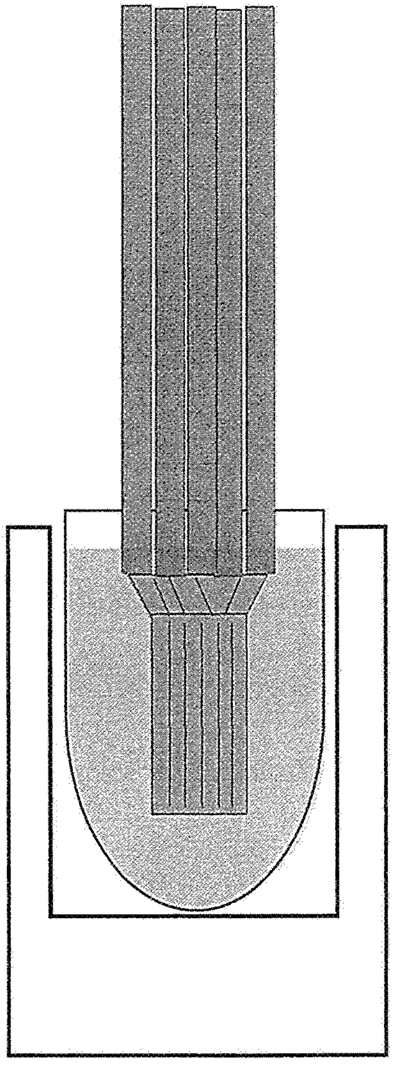
FIG. 2 schematically illustrates the state when the exposed parts of the core wires including the core wires connection section and the boundary part between the coated parts and the exposed parts of the core wires are immersed in the coated electric cable sealing composition of this invention filled in the resin cap.

The sealing composition of this invention is characterized in that the hardening time thereof at 130° C. is 10 minutes or less, and while the exposed parts of the core wires including the core wires connection section and the boundary part between the coated parts and the exposed parts of the core wires are perpendicularly immersed in the coated electric cable sealing composition filled in a resin cap and the sealing composition is heated to be cured, at the time point of hardening, the sealing composition permeates into inside of the coated electric wires, namely between the coating and each core wire, at a height of 5 mm or more from the boundary part between the coated parts and the exposed parts. Thus, the aforementioned advantageous effects of invention are exhibited. Moreover, as shown in FIG. 1 and FIG. 2, the boundary part between the coated parts and exposed parts is substantially parallel with the sealing composition. In addition, the sealing composition of this invention does not necessarily have to be cured at 130° C., and may be cured at a temperature lower than that.

For the coated electric cable sealing composition of this invention, the hardening time at 130° C. is preferably 7 minutes or less for higher productivity, and more preferably 4 minutes or less. Here, hardening means the o state in the evaluation of heating hardening performance shown in the Examples, and the hardening time means the shortest time from heating the liquid composition at room temperature to hardening according to the procedure of the Examples.

The so-called core wires connection section used in this invention, which is formed by electrically connecting a plurality of core wires exposed from a plurality of coated electric wires, as shown in FIG. 1, is formed by electrically connecting the plurality of core wires exposed at end portions of the plurality of coated electric wires with a method such as bonder processing, welding or fastening, and a conventionally known core wires connection section can be used without particular limitation. Here, in FIG. 1, "1" denotes a coated electric wire, "2" denotes the exposed part of a core wire, and "3" denotes a connection section (bonder-processed section) formed by electrically connecting a plurality of core wires.

As the coated electric cable sealing composition of this invention, a so-called two-liquid type thermosetting epoxy resin, which contains an epoxy component and a curing component, hardly causes occurrence of cracks or the like in the sealed section after the curing, and is therefore preferred.

The epoxy component of the coated electric cable sealing composition of this invention preferably contains, as a main component, an epoxy resin having 4 or less epoxy groups per molecule.

If the number of epoxy groups exceeds 4, the density of the crosslinking with the curing component increases within a very short period of time, so that while the core wires connection section is perpendicularly immersed in the coated electric cable sealing composition of this invention, the sealing composition does not permeate to inside of the coated electric wires at a height of 5 mm or more. As a result, the effect of this invention may not be obtained.

Here, the term "main component" means a component occupying 50 mass % or more, more preferably 80 mass % or more, in all epoxy components.

Examples of the epoxy component in the coated electric cable sealing composition of this invention include: bisphenol A epoxy resin, bisphenol F epoxy resin, glycidyl ether-based epoxy resins such as 1,4-cyclohexanedimethanol diglycidyl ether, and glycidyl ester-based epoxy resins such as diglycidyl phthalate, diglycidyl tetrahydrophthalate and diglycidyl hexahydrophthalate. However, in view of a great effect of improving the adhesion to the core wires and the coating material of the coated electric wires, the epoxy component preferably includes a bisphenol A epoxy resin and/or a bisphenol F epoxy resin as the main component.

The bisphenol A epoxy resin is preferably in a liquid state at room temperature (25° C.), and its viscosity is preferably 40 Pa·s or less, more preferably 25 Pa·s or less.

Moreover, the epoxy equivalent of the bisphenol A epoxy resin is preferably 225 or less.

On the other hand, the bisphenol F epoxy resin is preferably in a liquid state at room temperature (25° C.), and its viscosity is preferably 15 Pa·s or less, more preferably 5 Pa·s or less.

Moreover, the epoxy equivalent of the bisphenol F epoxy resin is preferably 190 or less.

The curing component in the coated electric cable sealing composition of this invention is preferably an amine compound or a mercapto compound.

By using these compounds, it is easy to obtain the effect that the formulation hardens within 10 minutes under the heating condition of 130° C.

Examples of the amine compound include chain aliphatic polyamines, cyclic aliphatic polyamines, aromatic polyamines, modified amines, and polyaminoamides (polyamide resins). For the reasons of good compatibility with the epoxy resin and excellent safety, the modified amines obtained from aliphatic polyamines and polyamide resins are preferred.

These compounds are preferably of those kinds that are uniformly dispersed or dissolved with the epoxy component.

These compounds preferably have a blending amount such that, with respect to 1 mol of epoxy groups that the epoxy component has, the amount of amino groups or mercapto groups that these compounds have is from 0.5 mol to 1.5 mol.

The coated electric cable sealing composition of this invention preferably further contains a reactive diluent in addition to the epoxy resin and the curing component.

The reactive diluent reduces viscosity without impairing properties of the epoxy resin, and has, with respect to the coated electric cable sealing composition of this invention, a function of reducing its viscosity to raise its permeability while the core wires connection section is immersed in the coated electric cable sealing composition.

Examples of the reactive diluent include alkyl monoglycidyl ethers, and alkyl diglycidyl ethers, etc.

The reactive diluent is preferably of a kind that is uniformly mixed or dissolved with the epoxy resin.

The coated electric cable sealing composition of this invention preferably further contains a coupling agent. The coupling agent may be, for example, a silane coupling agent having one or more alkoxysilyl groups in one molecule. Examples of the silane coupling agent include alkylalkoxysilanes, aminoalkoxysilanes, epoxyalkoxysilanes, vinylalkoxysilanes, and alkoxysilyl group-containing (meth)acrylates, etc.

The coupling agent has a function of improving the adhesion to the core wire and the coating material of the covered electric wires.

The coupling agent is preferably of a kind that is uniformly mixed or dissolved with the epoxy resin.

The coupling agent is preferably blended in an amount of 0.1 to 5 mass parts with respect to 100 mass parts of the epoxy component.

Various methods can be enumerated as a method for sealing a coated electric cable using the coated electric cable sealing composition of this invention, but a method comprising the following steps is preferred for ensuring water resistance and insulation.

Step (1) is filling the coated electric cable sealing composition in a resin cap.

Step (2) is immersing, in the coated electric cable sealing composition, the exposed parts of the core wires including the core wires connection section and the boundary part between the coated parts and the exposed parts of the core wires.

Step (3) is heating the resin cap to harden the coated electric cable sealing composition.

Examples of the resin cap used in the steps include a resin cap made of a vinyl chloride resin, and a heat-shrinkable cap made of a polyolefin resin or the like.

The coated electric cable sealing composition is filled in the resin cap using a dispenser or the like. The filling amount needs to be an amount allowing sufficient immersion of the entire exposed parts of the core wires including the core wires connection section and the boundary part between the coated parts and the exposed parts of the core wires.

Next, in the resin cap filled with the coated electric cable sealing composition, the entire exposed parts of the core wires including the core wires connection section and the boundary part between the coated parts and the exposed parts of the core wires are immersed to be covered by the composition. The resin cap has a function of protecting the connection section of the coated electric wires. By putting the coated electric cable sealing composition into a resin cap, immersing the entire exposed parts of the core wires including the core wires connection section and the boundary part between the coated parts and the exposed parts of the core wires, and hardening the coated electric cable sealing composition, a protection cap can be attached to the connection section of the coated electric wires.

Next, the resin cap is heated to harden the coated electric cable sealing composition.

Examples of the heating means include heaters, infrared rays, lasers, microwaves, induction heating, and so on, but in view of simple apparatus, a heater using a heat-generating element is preferred, and use of a Block Heater (registered trademark) adapted to the shape of the resin cap is preferred.

In this invention, the heating temperature is measured by a method of placing a test tube containing oil in the Block Heater and placing a thermocouple in the oil.

Moreover, it is also possible that the heating is performed after the exposed parts of the core wires including the core wires connection section and the boundary part between the coated parts and the exposed parts of the core wires are immersed in the coated electric cable sealing composition filled in the resin cap. However, in order to advance the time of hardening, it is preferred to heat the resin cap in advance.

The exposed parts of the core wires including the core wires connection section and the boundary part between the coated parts and the exposed parts of the core wires are preferably immersed in a direction approximately perpendicular to the liquid surface of the coated electric cable sealing composition inside of the resin cap. Though a slope may be set during immersion, in order to allow the coated electric cable sealing composition to permeate inside of the plurality of coated electric wires at a uniform height, the immersion direction is preferably perpendicular. The angle at which the coated wires are immersed with respect to the liquid surface of the coated electric cable sealing composition is preferably within a range of 85° to 95°, and the immersion direction can be regarded as being perpendicular when it is within the range.

The coated electric cable sealing composition of this invention satisfies the following conditions (1) and (2). Condition (1) is that hardening is achieved within 10 minutes at 130° C. Condition (2) is that while the exposed parts of the core wires including the core wires connection section and the boundary part between the coated parts and the exposed parts of the core wires are perpendicularly immersed in the coated electric cable sealing composition filled in a resin cap and the sealing composition is heat to be cured, at the time point of hardening, the coated electric cable sealing composition permeates into inside of the coated electric wires at a height of 5 mm or more.

If only condition (2) were to be satisfied, the viscosity of the coated electric cable sealing composition might be reduced to suppress the heating temperature, but the workability would be poor by doing so. On the other hand, as the viscosity of the composition rapidly increases with the heating curing and the rate of the increase depends on the temperature, it is considered that the time until complete hardening at a high temperature is too short for the sealing composition to permeate into narrow gaps such as the gap between the core wires in the core wires connection section, the gap between the coated electric wires, and the gap between each core wire and its coating, so that incomplete coating is formed. Therefore, the condition of forming a complete coating at the high-temperature curing temperature of 130° C. is not considered. In addition, because the resin cap is thermally deformed at a temperature exceeding 130° C., the temperature is preferably 130° C.

The coated electric cable with its core wires connection section sealed as above has high airtightness, and is preferably used for wiring harnesses of automobiles, household appliances and office automation equipment, etc. used in severe environments.

EXAMPLES

This invention is described in more details with the following examples, but is not limited thereto.

Example 1

40 parts by mass of a modified aliphatic polyamine as a curing component and 1 part by mass of 3-aminopropyltriethoxysilane as a coupling agent were blended with respect to 100 parts by mass of a bisphenol A epoxy resin to make a coated electric cable sealing composition.

Next, as shown in FIG. 1, 0.7 g of the composition was injected into a 12 mmϕ polyvinyl chloride cap. Further, the cap was housed in a heating block with an opening diameter of 13 mmϕ adapted to its shape.

On the other hand, an electric cable (called "electric cable A" hereinafter) was prepared, which was obtained by stripping off the coating of end portions of electric wires each having a core wire with a total diameter of 1.5 mm coated with a vinyl chloride resin of 0.3 mm thick, collecting five of the end portions and processing them with a bonder.

Next, as shown in FIG. 2, 3.5 cm of the tip portion of the electric cable A (including the exposed parts of the core wires including the core wires connection section and the boundary part between the coated parts and the exposed parts of the core wires) was immersed in the coated electric cable sealing composition inside of the polyvinyl chloride cap, and the coated electric cable sealing composition was heated at 130° C. for 5 minutes through the heating block and then cooled at room temperature for 1 hour. The resultant was used as a sample for permeation length and sealing performance tests.

Similarly, the tip portions of other electric cables A were each immersed in the coated electric cable sealing composition inside of a polyvinyl chloride cap, and the heating hardening performance while heating was made at 130° C. for 4 minutes or 7 minutes through the heating block was confirmed. The results are described in Table 1.

In the table, ○, Δ and x have the following meanings.

○: when the electric cable inside of the cap is lifted, the electric cable is not shifted in position, and falls off the heating block together with the cap.

Δ: when the electric cable inside of the cap is lifted, the electric cable is shifted in position, but still falls off the heating block together with the cap.

x: when the electric cable inside of the cap is lifted, the electric cable falls off the cap.

With respect to the above sample for permeation length and sealing performance tests, the permeation length was measured by the following method and recorded in Table 1.

(Permeation Length)

The polyvinyl chloride coating of the sealed electric cable was stripped off, the core wires were unwound, and then the permeation length of the sealing composition was measured.

With respect to the above sample, the sealing performances were evaluated using the following evaluation methods. The results are described in Table 1.

(Evaluation on Initial Sealing Performance)

Compressed air of 0.5 kg/cm$^2$ was fed from the unsealed side of the coated electric cable, and the tip of the sealed coated electric cable was immersed in water to check for air leakage.

In the table, ○and x have the following meanings.

○: no air leakage.

x: air leakage occurs.

Sealing performance evaluation after durability tests (1) Heat Resistance Test

The coated electric cable having been subjected to the sealing treatment was placed in an environment of 120° C. for 100 hours, and then presence or absence of air leakage was investigated in the same manner as in the evaluation on the initial sealing performance.

(2) Humidity and Heat Resistance Test

The coated electric cable having been subjected to the sealing treatment was placed in an environment of 80° C.×95% RH for 100 hours, and then presence or absence of air leakage was investigated in the same manner as in the evaluation on the initial sealing performance.

(3) Cooling-Heating Cycles Resistance Test

The coated electric cable having been subjected to the sealing treatment was subjected to 100 times of a temperature cycle of −40° C.×30 minutes to 120° C.×30 minutes, and then presence or absence of air leakage was investigated in the same manner as in the evaluation on the initial sealing performance.

Example 2

A coated electric cable with its end portion being sealing-treated was made as in Example 1 except that the kind of the electric cable was changed to an electric cable (electric cable B) that was obtained by stripping off the coating at end portions of electric wires each having a core wire with a total diameter of 2.5 mm being coated with a vinyl chloride resin of 0.3 mm thick, collecting two such core wires and processing them with a bonder, and then the various tests were conducted. The results are shown in Table 1.

Examples 3 to 9, and Comparative Examples 1 and 2

Coated electric cables with their end portions having been sealing-treated were made as in Example 2 except that the composition of the coated electric cable sealing composition was changed to that described in Table 1, and then the various tests were conducted. The results are shown in Table 1.

TABLE 1

| | Kind of electric cable | Permeation length (mm) | Heating hardening performance 130 °.C × 7 min | 130° C. × 4 min | Coated electric cable sealing composition Epoxy resin | | Curing component | |
|---|---|---|---|---|---|---|---|---|
| Example 1 | Electric cable A | 12 | ○ | ○ | Bisphenol A epoxy resin | 100 | Modified aliphatic polyamine (1) | 40 |
| Example 2 | Electric cable B | 15 | ○ | ○ | Bisphenol A epoxy resin | 100 | Modified aliphatic polyamine (1) | 40 |
| Example 3 | Electric cable B | 19 | ○ | ○ | Bisphenol A epoxy resin | 80 | Modified aliphatic polyamine (1) | 40 |
| Example 4 | Electric cable B | 35 | ○ | ○ | Bisphenol F epoxy resin | 90 | Modified aliphatic polyamine (2) | 20 |
| Example 5 | Electric cable B | 30 | ○ | ○ | Bisphenol F epoxy resin | 100 | Polyamidoamine resin | 50 |
| Example 6 | Electric cable B | 35 | ○ | ○ | Bisphenol A epoxy resin | 80 | Polyamidoamine resin | 50 |
| Example 7 | Electric cable B | 9 | ○ | ○ | Bisphenol A epoxy resin | 80 | Pentaerythritol terakis(3-mercaptopropionate) | 70 |
| | | | | | | | 2,4,6-Tris(dimethyl-aminomethyl)-phenol | 10 |
| Example 8 | Electric cable B | 50 | ○ | ○ | 1,4-Cyclo-hexanedimethnol diglycidyl ether | 100 | Polyamidoamine resin | 50 |
| Example 9 | Electric cable B | 23 | ○ | ○ | o-phthalate diglycidyl ether | 100 | Polyamidoamine resin | 50 |
| Comparative Example 1 | Electric cable B | 50 | × hardened not | × hardened not | Bisphenol A epoxy resin | 80 | Methyltetra-hydrophthalic anhydride | 85 |
| | | | | | | | 2,4,6-Tris(dimethyl-aminomethyl)-phenol | 1 |
| Comparative Example 2 | Electric cable B | 3 | ○ | ○ | Polyglycerol polyglycidyl ether | 100 | Polyamidoamine resin | 50 |

| | Coated electric cable sealing composition Reactive diluent | | Coupling agent | | Results of evaluations on sealing performances Initial | After resisting heat | After resisting humidity and heat | After resisting cycles |
|---|---|---|---|---|---|---|---|---|
| Example 1 | | | 3-Aminopropyl-triethoxysilane | 1 | ○ | ○ | ○ | ○ |
| Example 2 | | | 3-Aminopropyl-triethoxysilane | 1 | ○ | ○ | ○ | ○ |
| Example 3 | | | 3-Aminopropyl-triethoxysilane | 1 | ○ | ○ | ○ | ○ |
| Example 4 | Diol-based diglycidyl ether | 10 | | | ○ | ○ | ○ | ○ |
| Example 5 | | | | | ○ | ○ | ○ | ○ |
| Example 6 | Diol-based diglycidyl ether | 20 | | | ○ | ○ | ○ | ○ |
| Example 7 | Diol-based diglycidyl ether | 20 | | | ○ | ○ | ○ | ○ |
| | | | | | ○ | ○ | ○ | ○ |
| Example 8 | | | | | ○ | ○ | ○ | ○ |
| Example 9 | | | | | ○ | ○ | ○ | ○ |
| Comparative | Diol-based | 20 | | | ○ | ○ | ○ | ○ |
| Example 1 | diglycidyl ether | | | | × | | Unmeasurable | |
| Comparative Example 2 | | | | | × | | Unmeasurable | |

Bisphenol A epoxy resin: epoxy equivalent = 190 g/eq
Bisphenol F epoxy resin: epoxy equivalent = 166 g/eq
Modified aliphatic polyamine (1): amine value = 440 mgKOH/g
Modified aliphatic polyamine (2): amine value = 20 mgKOH/g
Polyamidoamine resin: cyclic aliphatic polyamidoamine having an amine value of 490 mgKOH/g
Diol-based diglycidyl ether: epoxy equivalent = 165 g/eq It is clear from Table 1 that the coated electric cable sealing compositions of Examples 1-9, each of which had a hardening time of 10 minutes or less thereof at 130° C. and permeated to inside of the coated electric wires at a height of 5 mm or more at the time point of hardening in the process in which the exposed parts of the core wires including the core wires connection section and the boundary part between the coated parts and the exposed parts of the core wires were immersed perpendicularly in the coated electric cable sealing composition filled in the resin cap and the coated electric cable sealing composition was heated to be cured, had good sealing performance at the initial stage and in the durability tests.

The composition of Comparative Example 1 used an acid anhydride as a curing component, and the progess of curing was slower than that in a case using an amine or mercapto curing component, so the hardening time at 130° C. exceeded 7 minutes, and therefore the initial sealing performance was bad.

On the other hand, because the composition of Comparative Example 2 used a material having about 6 epoxy groups per molecule as the epoxy component, the hardening came too fast, so that the resin did not permeate into inside of the coated electric wires and the initial sealing performance was bad.

The invention claimed is:

1. A coated electric cable comprising a coated electric wire section and exposed parts, wherein the exposed parts comprise a core wires connection section, wherein the core wires connection section is sealed with a coated electric cable sealing composition, and the coated electric cable sealing composition permeates to an inside of the coated electric wire section at a height of 5 mm or more from a boundary part between the coated electric wire section and the exposed parts, and wherein the coated electric cable sealing composition comprises an epoxy component and a curing component, the curing component is an amine compound or a mercapto compound, and wherein with respect to 1 mol of epoxy groups of the epoxy component, a blending amount of amino groups or mercapto groups of the amine compound or the mercapto compound is from 0.5 mol to 1.5 mol.

2. The coated electric cable of claim 1, being characterized in that the hardening time of the coated electric cable sealing composition at 130° C. is 4 minutes or less.

3. The coated electric cable of claim 1, wherein the epoxy component comprises, as a main component, an epoxy resin having 4 or less epoxy groups per molecule.

4. The coated electric cable of claim 1, wherein the epoxy component comprises, as a main component, a bisphenol A epoxy resin and/or a bisphenol F epoxy resin.

5. The coated electric cable of claim 1, wherein the coated electric cable sealing composition further comprises a reactive diluent.

6. The coated electric cable of claim 1, wherein the coated electric cable sealing composition further comprises a coupling agent.

7. The coated electric cable of claim 1, wherein when compressed air of 0.5 $kg/cm^2$ was fed from the coated electric cable, no air leakage occurs.

8. The coated electric cable of claim 1, wherein the amine compound is an aliphatic polyamine, a modified amine, or a polyamide resin.

* * * * *